US008290763B1

(12) United States Patent
Zhang

(10) Patent No.: US 8,290,763 B1
(45) Date of Patent: Oct. 16, 2012

(54) EMULATION SYSTEM, METHOD, AND COMPUTER PROGRAM PRODUCT FOR PASSING SYSTEM CALLS TO AN OPERATING SYSTEM FOR DIRECT EXECUTION

(75) Inventor: Zheng Zhang, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 682 days.

(21) Appl. No.: 12/204,639

(22) Filed: Sep. 4, 2008

(51) Int. Cl.
 *G06F 9/455* (2006.01)
(52) U.S. Cl. ......................................................... 703/26
(58) Field of Classification Search ..................... 703/26
 See application file for complete search history.

(56) References Cited

U.S. PATENT DOCUMENTS

| 5,910,180 | A * | 6/1999 | Flory et al. ..................... 719/321 |
| 2003/0212902 | A1* | 11/2003 | van der Made ................ 713/200 |
| 2004/0259640 | A1* | 12/2004 | Gentles et al. ..................... 463/42 |
| 2005/0251693 | A1* | 11/2005 | Shevchenko .................. 713/193 |
| 2007/0112574 | A1* | 5/2007 | Greene ............................... 705/1 |
| 2007/0276823 | A1* | 11/2007 | Borden et al. ..................... 707/5 |

OTHER PUBLICATIONS

"GreenBorder," Feb. 13, 2008, as retrieved by the Internet Archive Wayback Machine, http://web.archive.org/web/20080213021411/ http://www.greenborder.com/.
"GreenBorder Keeps you Safe on the Internet," Mar. 5, 2007, as retrieved by the Internet Archive Wayback Machine, http://web.archive.org/web/20070305231101/http://www.greenborder.com/.
"About Sandboxie," copyright 2004-2008 by Ronen Tzur, www.sandboxie.com.
"VMware: Virtualization via Hypervisor, Virtual Machine & Server Consolidation," copyright 2008, VMware, Inc., www.vmware.com.
GreenBorder Support, www.greenborder.com, printed Sep. 4, 2008.
Software Virtualization Solution (SVS) 2.1.2084, www.download.com/Software-Virtualizatoin-Solution-SVS-/3000-2651_4-10516806.html, printed Sep. 4, 2008.

* cited by examiner

*Primary Examiner* — Dwin M Craig
*Assistant Examiner* — Andre Pierre Louis
(74) *Attorney, Agent, or Firm* — Patent Capital Group

(57) ABSTRACT

An emulation system, method, and computer program product are provided for passing system calls to an operating system for direct execution. In operation, a file is loaded into memory and instructions associated with the loaded file are emulated. Furthermore, system calls resulting from the emulation are identified. Still yet, at least a portion of the system calls are passed to an operating system for direct execution thereof. In addition, application programming interfaces are provided for external components to access, to monitor and to control the aforementioned system.

18 Claims, 5 Drawing Sheets

EMULATION SYSTEM, METHOD, AND COMPUTER PROGRAM PRODUCT FOR PASSING SYSTEM CALLS TO AN OPERATING SYSTEM FOR DIRECT EXECUTION

FIELD OF THE INVENTION

The present invention relates to emulation systems, and more particularly to emulating sample files for identifying unwanted behavior.

BACKGROUND

Malware authors compress and encrypt executable programs to obfuscate code of the malicious program and to evade detection from anti-malware products. Malware authors also include code to prevent debugging and/or code to prevent strict emulation. These techniques force researchers to spend considerable time reverse engineering virus samples and to understand their behavior. There is thus a need for overcoming these and/or other issues.

SUMMARY

An emulation system, method, and computer program product are provided for passing system calls to an operating system for direct execution. In operation, a file is loaded into memory. Additionally, instructions associated with the loaded file are emulated. Furthermore, system calls resulting from the emulation are identified. Still yet, at least a portion of the system calls are passed to an operating system for direct execution thereof.

DETAILED DESCRIPTION

Figure 1:
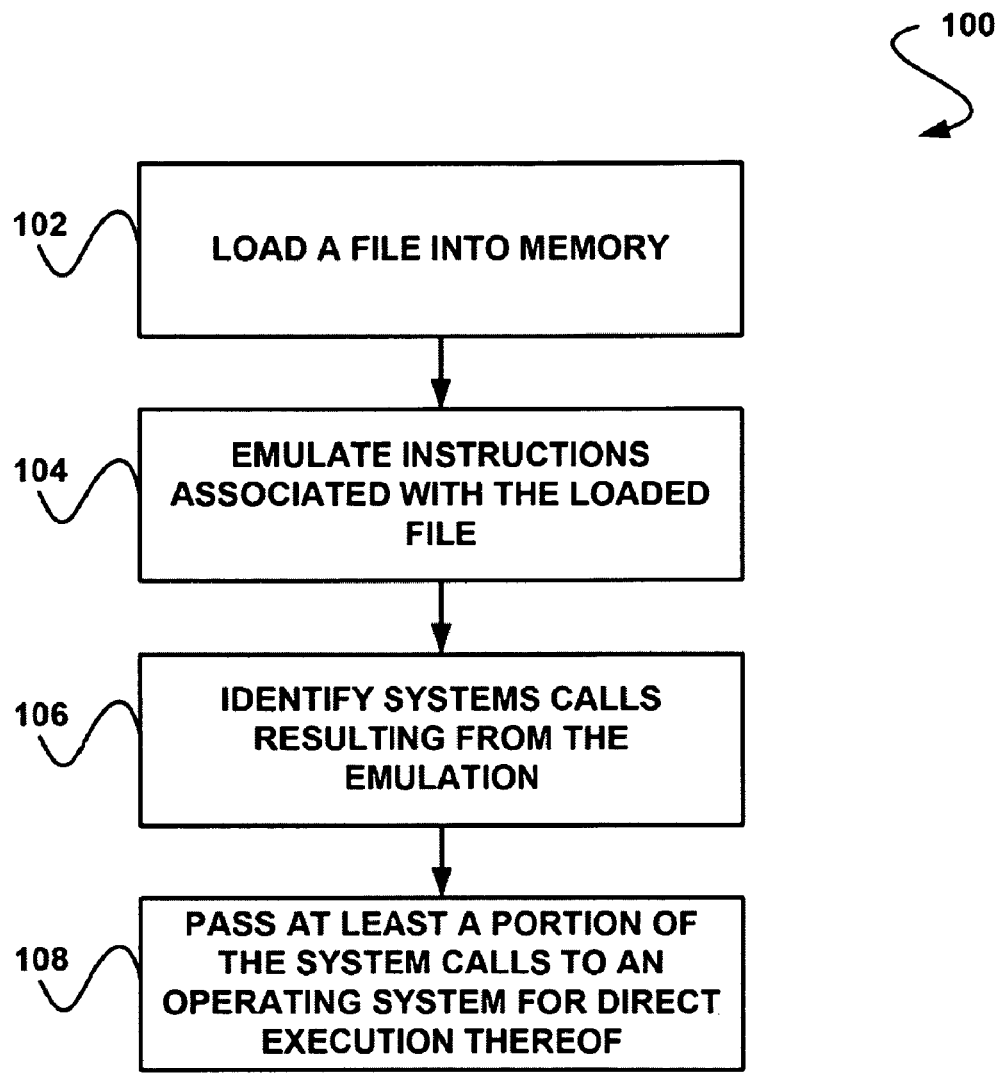
FIG. 1 shows a method for passing system calls to an operating system for direct execution, in accordance with one embodiment.

FIG. 1 shows a method 100 for passing system calls to an operating system for direct execution, in accordance with one embodiment. As shown, a file is loaded into memory. See operation 102.

The file may include any file with associated instructions or that is capable of being executed. For example, in various embodiments, the file may include a suspicious executable file, a new file to be tested, an unknown file, and/or any other file that meets that meets the above definition. Once the file is loaded, instructions associated with the loaded file are emulated. See operation 104.

The emulation may include emulating any instructions associated with the file. For example, in one embodiment, the emulation may include emulating regular instructions (e.g. binary instructions, etc.). As an option, the emulation may include emulating instructions associated with sensitive system calls (e.g. calls to read, to write, or to delete files, directories, registries, etc.), potentially harmful system calls (e.g. calls to create, to terminate, or to compromise core system processes and services, etc.), and/or any other system calls.

Furthermore, system calls resulting from the emulation are identified. See operation 106. The system calls resulting from the emulation may include any system calls including sensitive system calls, and potentially harmful system calls, etc. In one embodiment, the systems calls that are identified may include system calls with destination addresses outside a sample image associated with the emulation.

Still yet, at least a portion of the system calls are passed to an operating system for direct execution thereof. See operation 108. In this case, direct execution refers to execution of system calls by an operating system.

In one embodiment, the at least a portion of the system calls may include system calls that are determined to be harmless based on the emulation. In another embodiment, the at least a portion of the system calls may include system calls that are determined to be harmless based on a type of system call. For example, system calls that do not involve accessing registries, files or other sensitive system resources may be determined to be harmless system calls.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
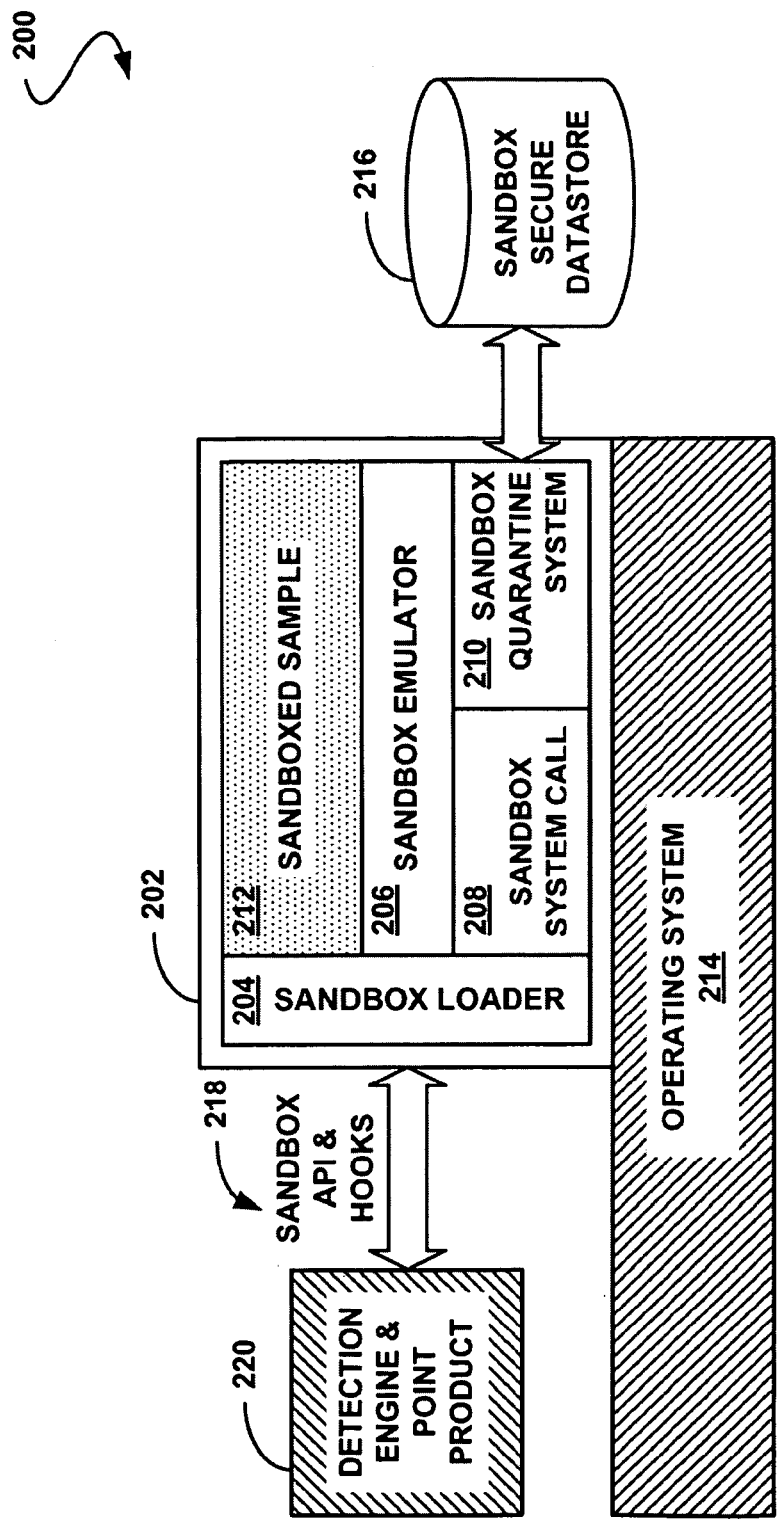
FIG. 2 shows an emulator system for passing system calls to an operating system for direct execution, in accordance with one embodiment.

FIG. 2 shows an emulator system 200 for passing system calls to an operating system for direct execution, in accordance with one embodiment. As an option, the system 200 may be implemented in the context of the environment of FIG. 1. Of course, however, the system 200 may be implemented in any desired environment. It should also be noted that the aforementioned definitions may apply during the present description.

As shown, a sandbox 202 is provided. In the context of the present description, a sandbox refers to any security mechanism or space for safely running programs or executing instructions. As an option, the sandbox 202 may include any components used to create an environment that mimics or replicates a system (e.g. a host system, etc.).

In this case, the system may include a client or server system. Such server and/or client may include any system capable of executing an application or instruction. For example, in various embodiments, the system may include a desktop computer, lap-top computer, hand-held computer, mobile phone, personal digital assistant (PDA), peripheral (e.g. printer, etc.), any component of a computer, and/or any other type of logic.

As shown further in FIG. 2, the sandbox 202 includes a sandbox loader 204, a sandbox emulator 206, a sandbox system call 208, and a sandbox quarantine system 210. It should be noted that, in other embodiments, the sandbox 202 may include additional functionality, including additional hardware and/or logic. In one embodiment, at least some of the various functionalities illustrated in FIG. 2 may be combined.

In operation, the sandbox loader 204 is capable of loading a sandboxed sample file 212 (e.g. a suspicious executable, etc.) and performing initialization. The sandbox emulator 206 may be utilized to emulate instructions (e.g. binary instructions, etc.) and manage memory associated with the sandbox 202. The sandbox system call 208 may be utilized to inspect all system calls initiated by the sample file 212.

Furthermore, the sandbox system call 208 may selectively emulate certain system calls (e.g. sensitive system calls, etc.) and pass the remaining system calls (e.g. non-sensitive system calls, etc.) to an operating system 214 (e.g. a Windows operating system, etc.) for direct execution. The sandbox quarantine system 210 may be utilized to capture and log all files and registries modified by the sample file 212. The sandbox quarantine system 210 may also have access to a sandbox secure datastore 216 for logging the captured files and/or registries.

Additionally, the sandbox 202 may include one or more application programming interfaces (API) and/or hooks 218 that are capable of providing API and callback interfaces for external components to communicate with and/or control the sandbox 202. For example, the API and/or hooks 218 may allow a detection engine and point product 220 to communicate with and/or control the sandbox 202.

In one embodiment, the system 200 may utilize both emulators and native-execution sandboxes. For example, all regular instructions and sensitive system calls may be emulated by the sandbox 202. Additionally, the non-sensitive system calls may be passed to the operating system 214 for direct execution.

In this way, the sample file 212 may be executed in a secure and realistic environment. Moreover, because the sandbox 202 is able to maintain complete control of the sample file instruction flows, the sandbox 202 is able to collect many more behavioral events than the number of events collected utilizing only a native-execution sandbox.

Figure 3:
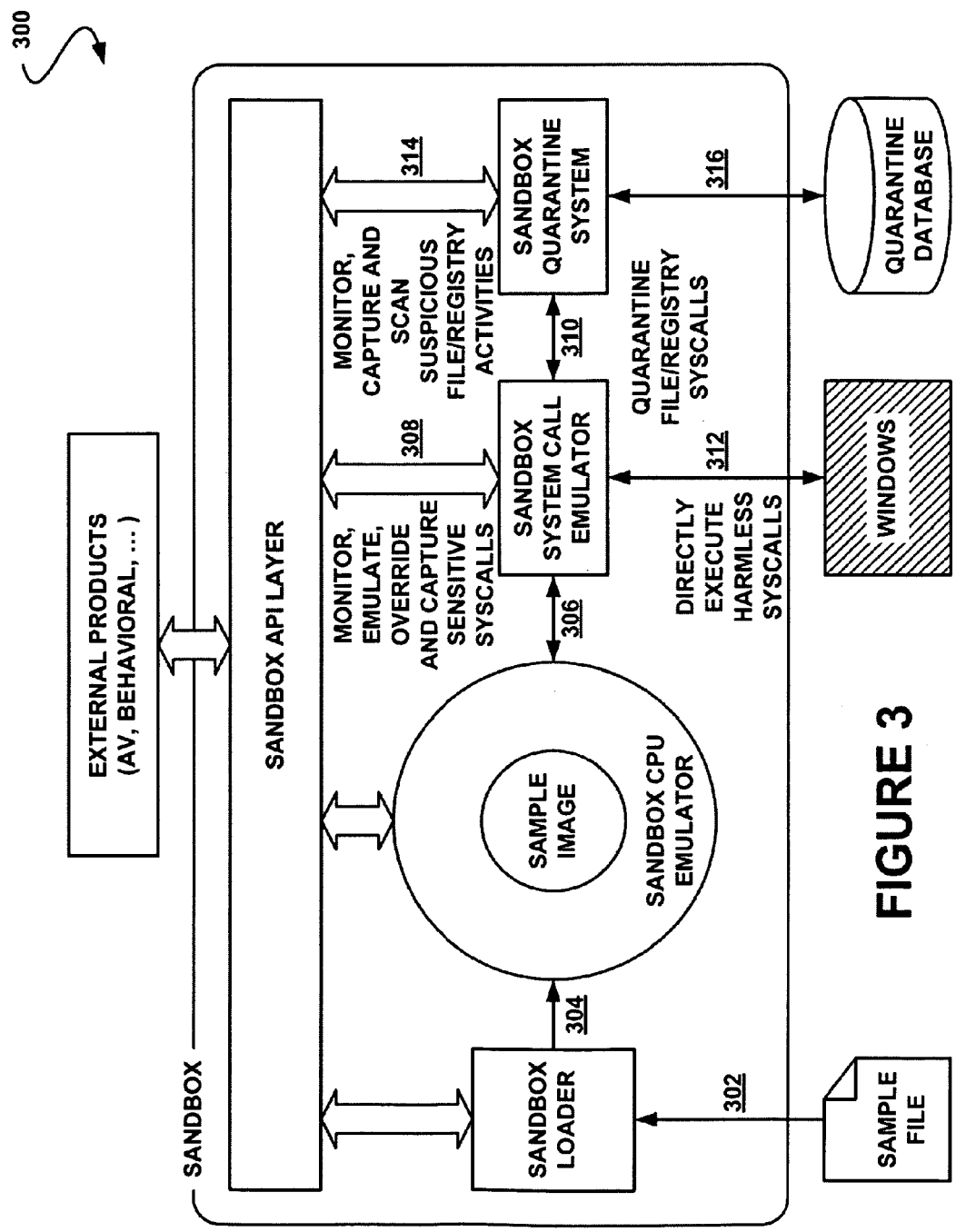
FIG. 3 shows a flow diagram for handling a sample file within a sandbox, in accordance with one embodiment.

FIG. 3 shows a flow diagram 300 for handling a sample file within a sandbox, in accordance with one embodiment. As an option, the flow diagram 300 may be implemented in the context of the architecture and environment of FIGS. 1-2. Of course, however, the flow diagram 300 may be implemented in any desired environment. Again, the aforementioned definitions may apply during the present description.

As shown, a sample file is loaded by a sandbox loader into memory. See operations 302-304. In this case, an image of the sample file may be stored in memory. A virtual sandbox central processing unit (CPU) emulator then emulates the instructions included in the sample image in the same way that the sample image would be directly executed in an actual CPU utilized by an operating system for direct processing.

All system calls with destination addresses outside of the sample image may be handled by a sandbox system call emulator based on the nature of the system calls. See operation 306. For example, sensitive and potentially harmful system calls may be captured, emulated, and overridden. See operation 308.

System calls related to a file and/or a registry may be redirected to a sandbox quarantine system. See operation 310. The remaining harmless calls may then be passed to the underlying operating system for direct execution. See operation 312.

In this way, the system calls may be classified into different categories and may be processed differently based on an associated category. For example, it may be determined whether the system calls include system calls that are at least potentially harmful. In this case, the potentially harmful system calls may be emulated and overridden and at least a portion of harmless system calls may be passed to the operating system for direct execution.

The results of the system calls may be identified and returned back to the CPU emulator to continue emulating. Additionally, a sandbox quarantine system may capture all file and registry accesses and redirect the file/registry modifications into a secured quarantine database. See operation 314-316.

As an example, it may be determined whether the system calls include file system calls that are related to at least one file (e.g. a file including a registry, etc.). If it is determined that the system calls include file system calls, the file system calls may be quarantined. Furthermore, modifications associated with the file system calls may be stored in the quarantine database.

In one embodiment, it may also be determined whether the sample file is safe. In this case, the modifications may continue to be quarantined if it is determined that the file is not safe. Alternatively, the modifications may be committed if it is determined that the file is safe.

For instance, the sandbox may capture and redirect all file and registry modifications to the separate secure storage. In this case, the quarantine operations may be transparent to the sandboxed sample, such that the sample will continue to run as if it were being directly executed in a non-virtual system. Thus, a host machine will be safe because the file and registry modifications have been redirected to secure storages.

Additionally, the quarantined files and registries may be scanned by anti-virus software or other security software for known threads. Furthermore, if the sample file is determined to be malicious, the quarantined files and registries may be easily reverted by removing the quarantine storage. On the other hand, if the sample is later determined to be clean, the file and registry modifications may be committed into the host system and the sample may be released from the sandbox.

It should be noted that multiple samples may be sandboxed concurrently and quarantined into different quarantine storages without interfering with each other. As an option, the functionality and behavior of the sandbox may be extended by a sandbox API layer, which provides the programming interfaces for external applications (e.g. anti-virus and behavioral engines, point products, etc.) to monitor, control, and intervene the sample file emulation process. For example, an interface may be utilized for providing access to the sandbox emulator.

Additionally, an engine may be deployed to scan the sample memory image in the middle of execution. As another example, a behavior detection engine may be utilized to model and classify run-time behavior patterns based on various events generated by the sandbox (e.g. system calls, file and registry accesses, long jumps, exceptions, etc.).

Furthermore, in various embodiments, additional functionality may be included with the sandbox. For example, in one embodiment, dynamic code guards driven by a sandbox API and data files may be provided. In this case, the code guards may ensure that vital program code is not patched. Furthermore, these code guards may perform and verify checksums on critical code sections. In another case, buffer overflow exploits could be detected and blocked through bounds and memory integrity checking. As an option, this functionality may be implemented by inspecting trace logs.

In another embodiment, a user mode dataflow trace may be included for key presses and message loops. In this case, the dataflow trace may identify DLLs and modules (e.g. browser objects, etc.) that have experienced key presses. As an option, this feature may utilize the sandbox emulator to trace and report which DLLs log key presses, thereby providing a chain of custody audit.

In yet another embodiment, robust change revision control may be included. In this case, the revision control may allow the management of Internet sessions beyond wiping and resetting the quarantine folder. Thus, the sandbox may be implemented as a component for behavior scanners. In this way, the sandbox may allow revision if the behavior is not detected in time.

In still another embodiment, a code trace may be implemented for network traffic, registry access, and file access. In another embodiment, a close integration of anti-virus and anti-malware software may be implemented. In this case, when detection occurs, an anti-virus engine may instruct the sandbox to revert to a previous clean state. Additionally, when new processes or files are created, the sandbox may inform the anti-virus engine to scan the files.

As an option, application level snapshot and rollback may be implemented. For example, configuration data of an application may be saved between sessions. In this way, the configuration may be used for rollback.

As another option, the sandbox quarantine system and/or quarantine folder may be encrypted. In this case, the sandbox quarantine system and/or quarantine folder may be encrypted utilizing any suitable encryption technology. For example, in one embodiment, Safeboot technology may be utilized to encrypt the sandbox quarantine system and/or quarantine folder.

In one embodiment, behavior of an application may be extended or limited via scripts. For example, it is often desired to have different levels of access control, depending on the situation. Table 1 illustrates an example of some different levels of access control in different situations.

TABLE 1

|  | Allow file read? | Allow file write? |
| --- | --- | --- |
| Full access - no sandboxing | Yes | Yes |
| Limited access - no file modification or creation | Yes | No |
| Restricted access - only allow file creation | No | Yes |
| Deny all access - useful for personal folders | No | No |

As an option, the different access levels illustrated in Table 1 may be controlled and customized utilizing a script for specific applications. The scripts may grant different access depending on the resource which is requested. For instance, if the resource requested is outside the sandbox, access may be denied.

Utilizing these techniques, sandboxing of applications may be implemented to prevent identity theft and malware installations by redirecting file and registry operations to a secure, managed environment. Furthermore, the sandboxed application may run in this environment without modifying the host system. When malicious behavior is suspected or detected, a user can wipe or roll-back the environment to a previous snapshot or a known clean state.

Figure 4:
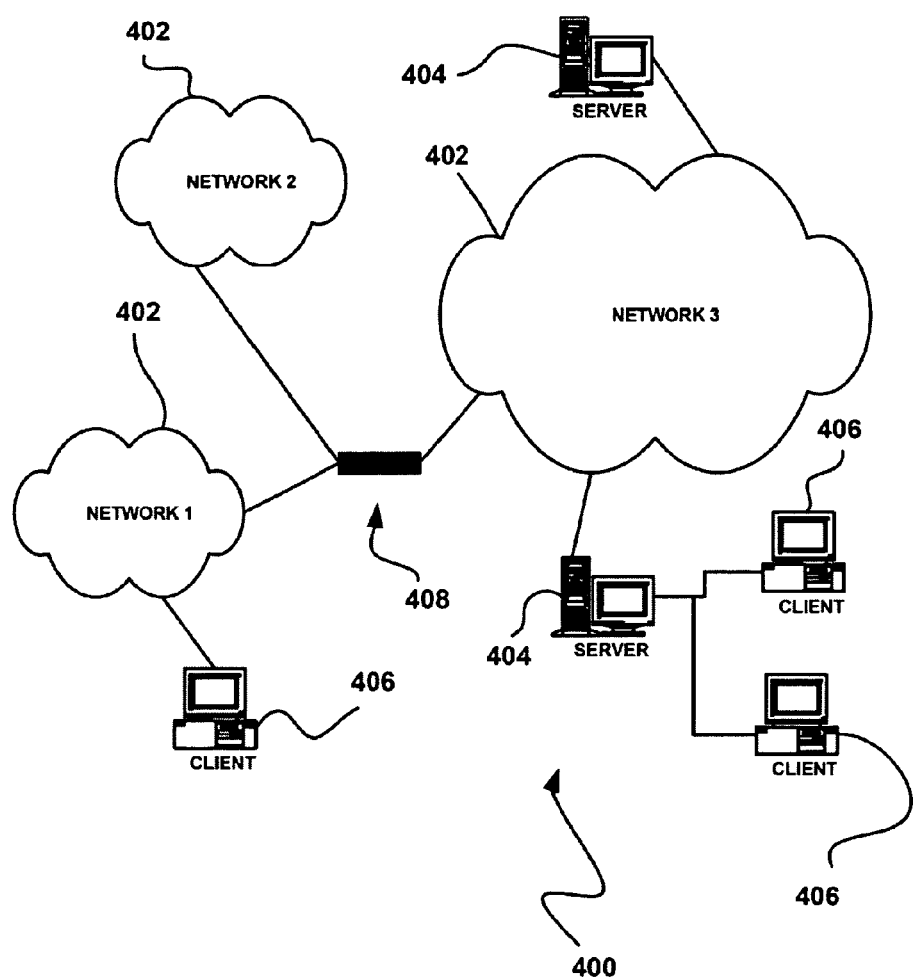
FIG. 4 illustrates a network architecture, in accordance with one embodiment.

FIG. 4 illustrates a network architecture 400 in which the various architecture and/or functionality of the various previous embodiments may be implemented. As shown, a plurality of networks 402 is provided. In the context of the present network architecture 400, the networks 402 may each take any form including, but not limited to a local area network (LAN), a wireless network, a wide area network (WAN) such as the Internet, peer-to-peer network, etc.

Coupled to the networks 402 are servers 404 which are capable of communicating over the networks 402. Also coupled to the networks 402 and the servers 404 is a plurality of clients 406. Such servers 404 and/or clients 406 may each include a desktop computer, lap-top computer, hand-held computer, mobile phone, personal digital assistant, peripheral (e.g. printer, etc.), any component of a computer, and/or any other type of logic. In order to facilitate communication among the networks 402, at least one gateway 408 is optionally coupled therebetween.

Figure 5:
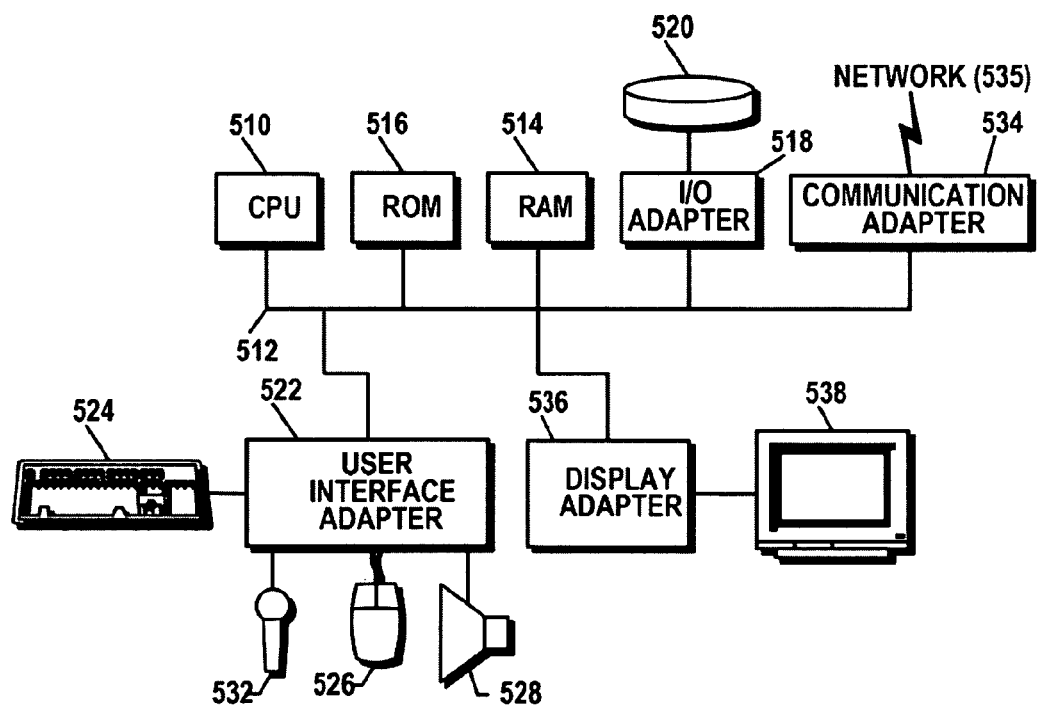
FIG. 5 shows a representative hardware environment that may be associated with the servers and/or clients of FIG. 4, in accordance with one embodiment.

FIG. 5 shows a representative hardware environment that may be associated with the servers 404 and/or clients 406 of FIG. 4, in accordance with one embodiment. Such figure illustrates a typical hardware configuration of a workstation in accordance with one embodiment having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen (not shown) to the bus 512, communication adapter 534 for connecting the workstation to a communication network 535 (e.g., a data processing network) and a display adapter 536 for connecting the bus 512 to a display device 538.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable storage medium for performing operations, comprising:

loading a file into a sandbox coupled to an operating system and configured for running suspicious executable code, wherein the sandbox replicates a host system that would otherwise receive the file and the sandbox includes code guards driven by a sandbox application program interface (API) that ensures certain portions of program code are not patched;

emulating instructions associated with the loaded file;

identifying system calls resulting from the emulation;

determining whether the system calls include system calls that are at least potentially harmful, wherein the potentially harmful system calls are overridden, wherein a first portion of the system calls associated with a registry is redirected to a quarantine system for scanning using antivirus software, and wherein a second portion of the system calls associated with harmless system calls is passed to the operating system for direct execution; and receiving an instruction to revert to a previous clean state of the operating system based on detecting malware associated with the loaded file, wherein the clean state includes an application level snapshot of configuration data of an application that was saved between multiple sessions, said application level snapshot of configuration data being used during rollback implementation.

2. The computer program product of claim 1, wherein the emulation is performed utilizing a central processing unit emulator.

3. The computer program product of claim 1, wherein the systems calls that are identified include system calls with destination addresses outside a sample image associated with the emulation.

4. The computer program product of claim 1, wherein the system calls are classified into different categories.

5. The computer program product of claim 4, wherein the system calls are processed differently based on an associated category.

6. The computer program product of claim 1, the operations further comprising:
   determining whether the system calls include file system calls that are related to at least one file.

7. The computer program product of claim 6, wherein the at least one file includes a registry.

8. The computer program product of claim 6, wherein the file system calls are quarantined.

9. The computer program product of claim 8, wherein modifications associated with the file system calls are stored in a quarantine database.

10. The computer program product of claim 1, the operations further comprising:
    determining whether the file is safe.

11. The computer program product of claim 10, wherein the modifications continue to be quarantined if it is determined that the file is not safe.

12. The computer program product of claim 10, wherein the modifications are committed if it is determined that the file is safe.

13. The computer program product of claim 1, the operations further comprising:
    identifying results of the portion of system calls.

14. The computer program product of claim 1, the operations further comprising:
    returning the results of the portion of system calls for being used during the emulation.

15. The computer program product of claim 1, further comprising an interface for providing access to the emulating.

16. A method, comprising:
    loading a file into a sandbox coupled to an operating system and configured for running suspicious executable code, wherein the sandbox replicates a host system that would otherwise receive the file and the sandbox includes code guards driven by a sandbox application program interface (API) that ensures certain portions of program code are not patched;
    emulating instructions associated with the loaded file;
    identifying system calls resulting from the emulation;
    determining whether the system calls include system calls that are at least potentially harmful, wherein the potentially harmful system calls are overridden, wherein a first portion of the system calls associated with a registry is redirected to a quarantine system for scanning using antivirus software, and wherein a second portion of the system calls associated with harmless system calls is passed to the operating system for direct execution; and
    receiving an instruction to revert to a previous clean state of the operating system based on detecting malware associated with the loaded file, wherein the clean state includes an application level snapshot of configuration data of an application that was saved between multiple sessions, said application level snapshot of configuration data being used during rollback implementation.

17. A system, comprising:
    a sandbox configured for receiving a loaded file, the sandbox being coupled to an operating system and configured for running suspicious executable code, wherein the sandbox replicates a host system that would otherwise receive the file and the sandbox includes code guards driven by a sandbox application program interface (API) that ensures certain portions of program code are not patched;
    logic for:
        emulating instructions associated with the loaded file and identifying system calls resulting from the emulation;
        determining whether the system calls include system calls that are at least potentially harmful, wherein the potentially harmful system calls are overridden, wherein a first portion of the system calls associated with a registry is redirected to a quarantine system for scanning using antivirus software, and wherein a second portion of the system calls associated with harmless system calls is passed to the operating system for direct execution; and
        receiving an instruction to revert to a previous clean state of the operating system based on detecting malware associated with the loaded file, wherein the clean state includes an application level snapshot of configuration data of an application that was saved between multiple sessions, said application level snapshot of configuration data being used during rollback implementation;
    a processor for executing the second portion of the system calls passed to the operating system.

18. The system of claim 17, wherein the processor is coupled to memory via a bus.

* * * * *